Feb. 26, 1963 A. ABGARIAN 3,079,166
GOLF CART
Filed March 31, 1959 5 Sheets-Sheet 2
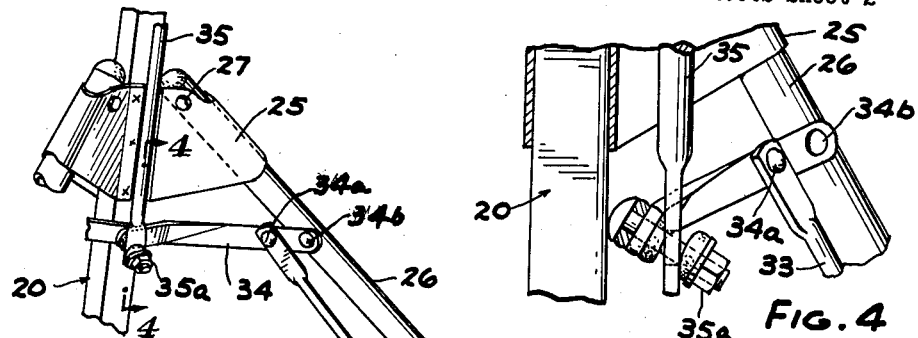
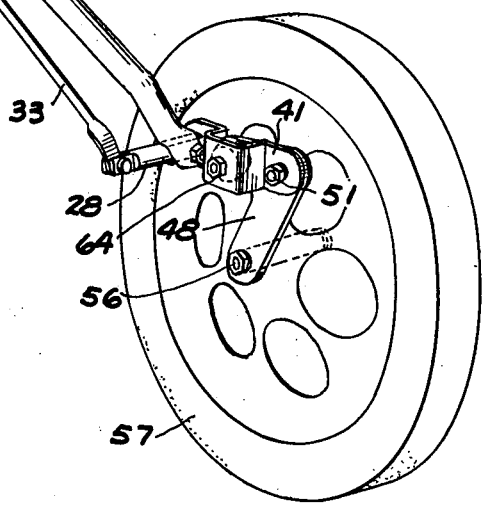
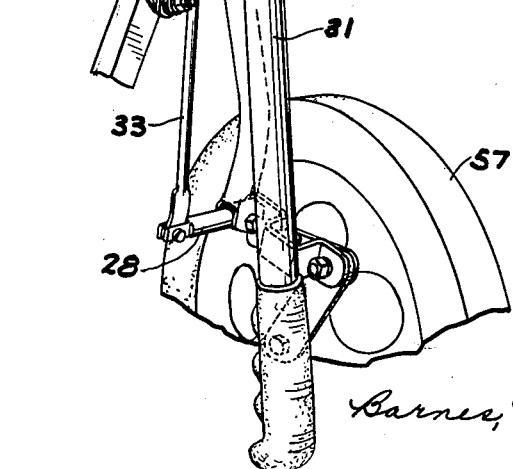
INVENTOR.
ARAM ABGARIAN
ATTORNEYS Feb. 26, 1963  A. ABGARIAN  3,079,166
GOLF CART Filed March 31, 1959  5 Sheets-Sheet 3

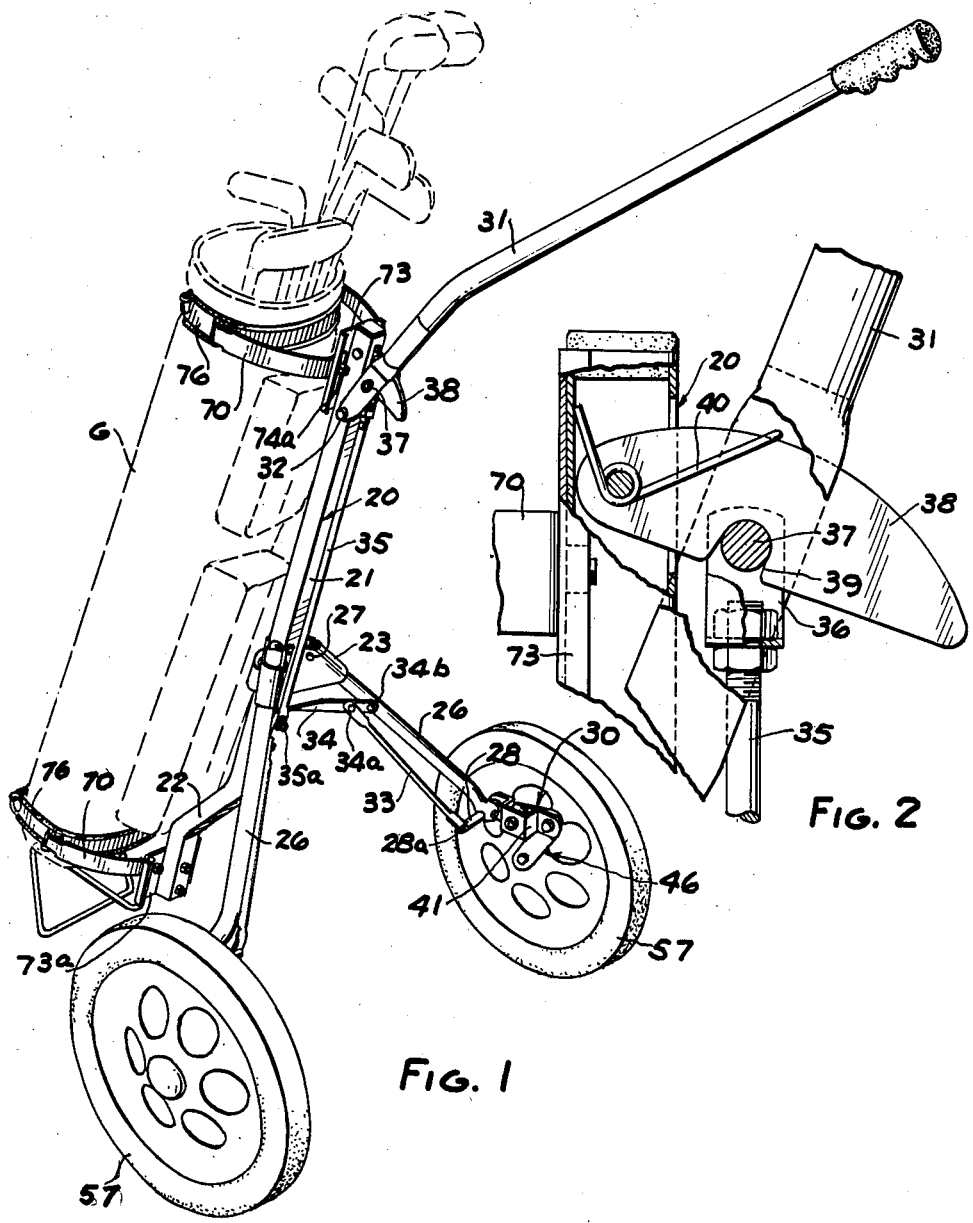

INVENTOR.
ARAM ABGARIAN
BY
Barney, Kisselle, Raisch & Choate
ATTORNEYS

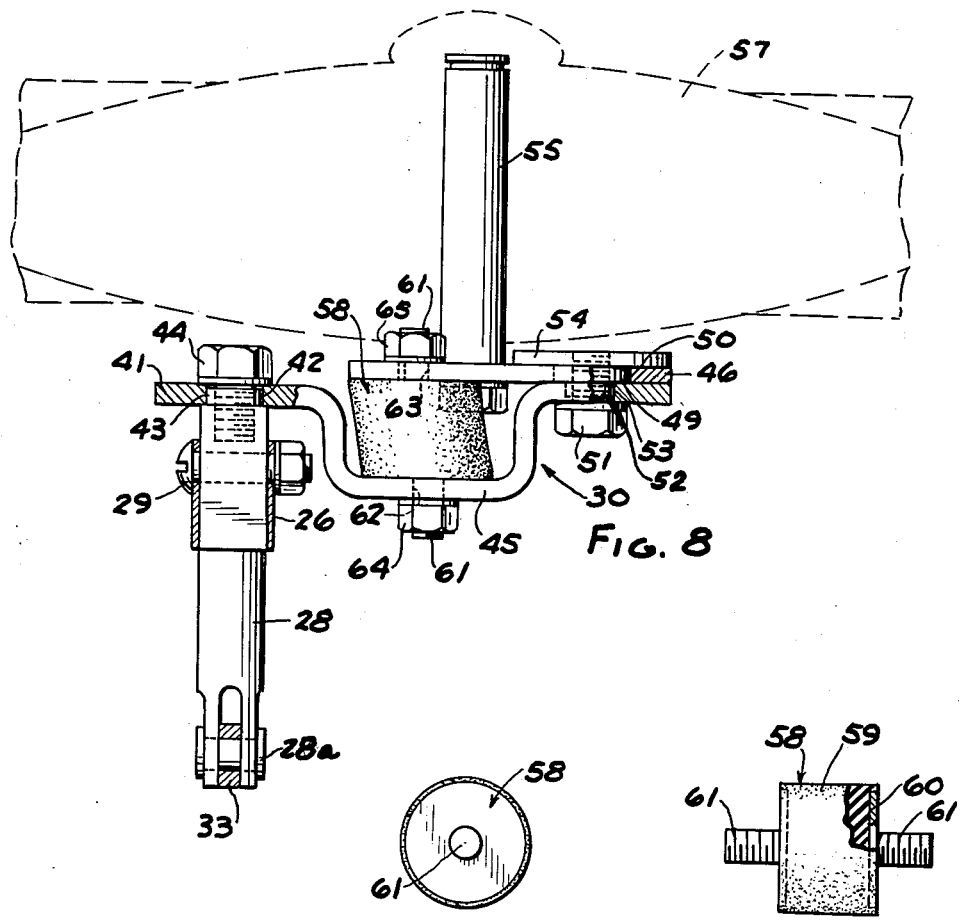

Feb. 26, 1963
A. ABGARIAN
3,079,166
GOLF CART
Filed March 31, 1959
5 Sheets-Sheet 5
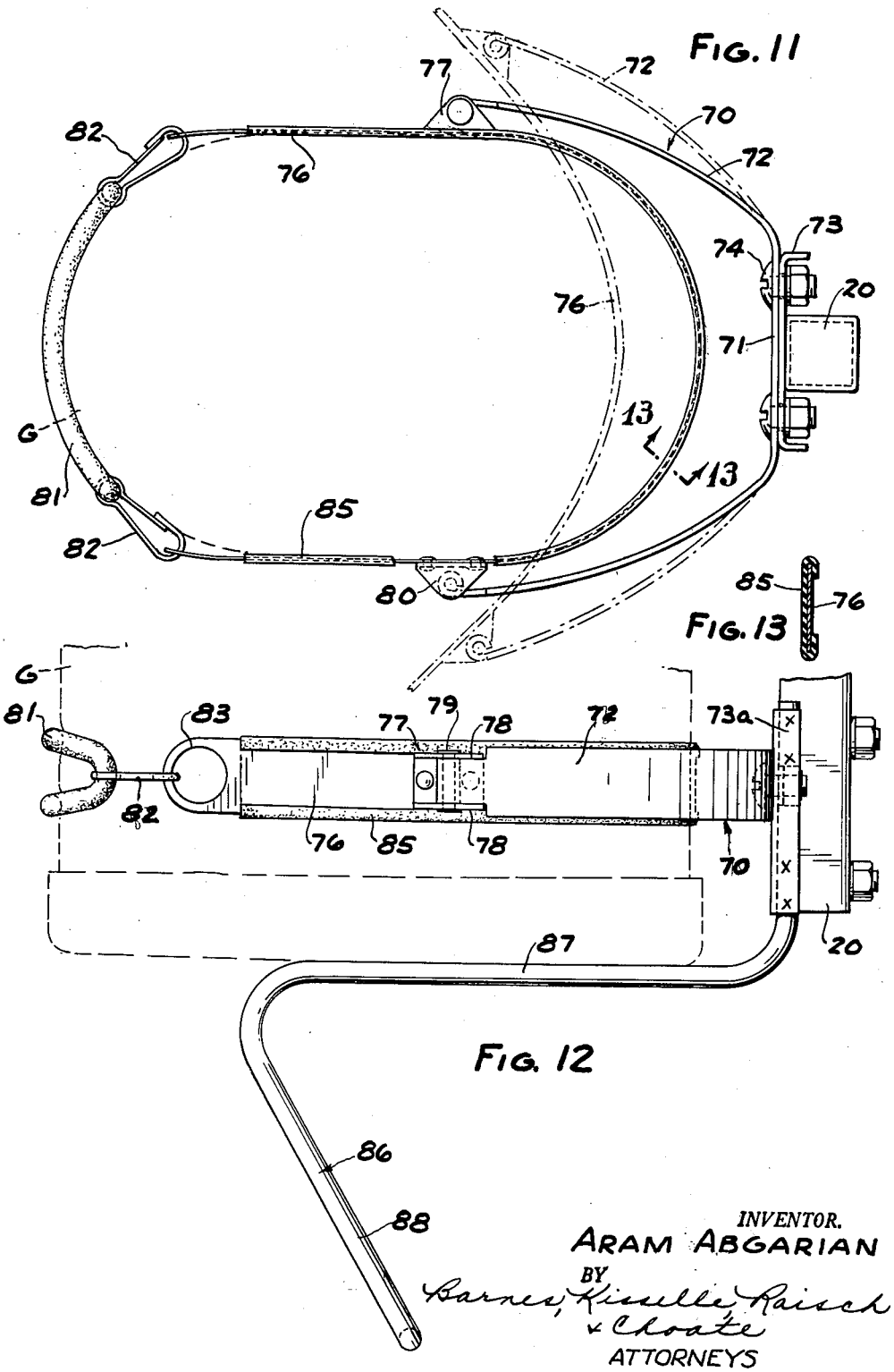
INVENTOR.
ARAM ABGARIAN
BY
Barnes, Kisselle, Raisch
& Choate
ATTORNEYS

United States Patent Office 3,079,166
Patented Feb. 26, 1963

3,079,166
GOLF CART
Aram Abgarian, % United Metal Products Corp.,
8101 Lyndon Ave., Detroit 21, Mich.
Filed Mar. 31, 1959, Ser. No. 803,297
7 Claims. (Cl. 280—40)

This invention relates to golf bag carts.

It is an object of this invention to provide a golf cart which can be pulled over the relatively rough ground of a golf course with a minimum of effort; which has novel means for suspending the wheels from the frame thereof; and which has novel means thereon for supporting and engaging the golf bag.

In the drawings:

FIG. 1 is a perspective view of a golf cart embodying the invention, the golf bag being shown in broken lines.

FIG. 2 is a fragmentary elevation of the upper portion of the golf cart with parts broken away.

FIG. 3 is a fragmentary perspective view of the lower portion of the golf cart.

FIG. 4 is a fragmentary sectional view taken along the lines 4—4 in FIG. 3.

FIG. 5 is a fragmentary perspective view showing the golf cart in collapsed condition.

FIG. 8 is a fragmentary plan view of the wheel suspension arrangement illustrated in FIG. 7 in the unloaded condition of the cart.

FIG. 9 is an end view of the rubber spring element used in the wheel suspension arrangement.

FIG. 10 is a part sectional side elevation of the spring element shown in FIG. 9.

FIG. 11 is a plan view of the golf bag supporting structure at the upper end of the golf cart.

FIG. 12 is a side elevation of the supporting structure for the golf bag at the lower end of the golf cart.

FIG. 13 is a sectional view taken along the line 13—13 in FIG. 11.

Figures 6, 7:
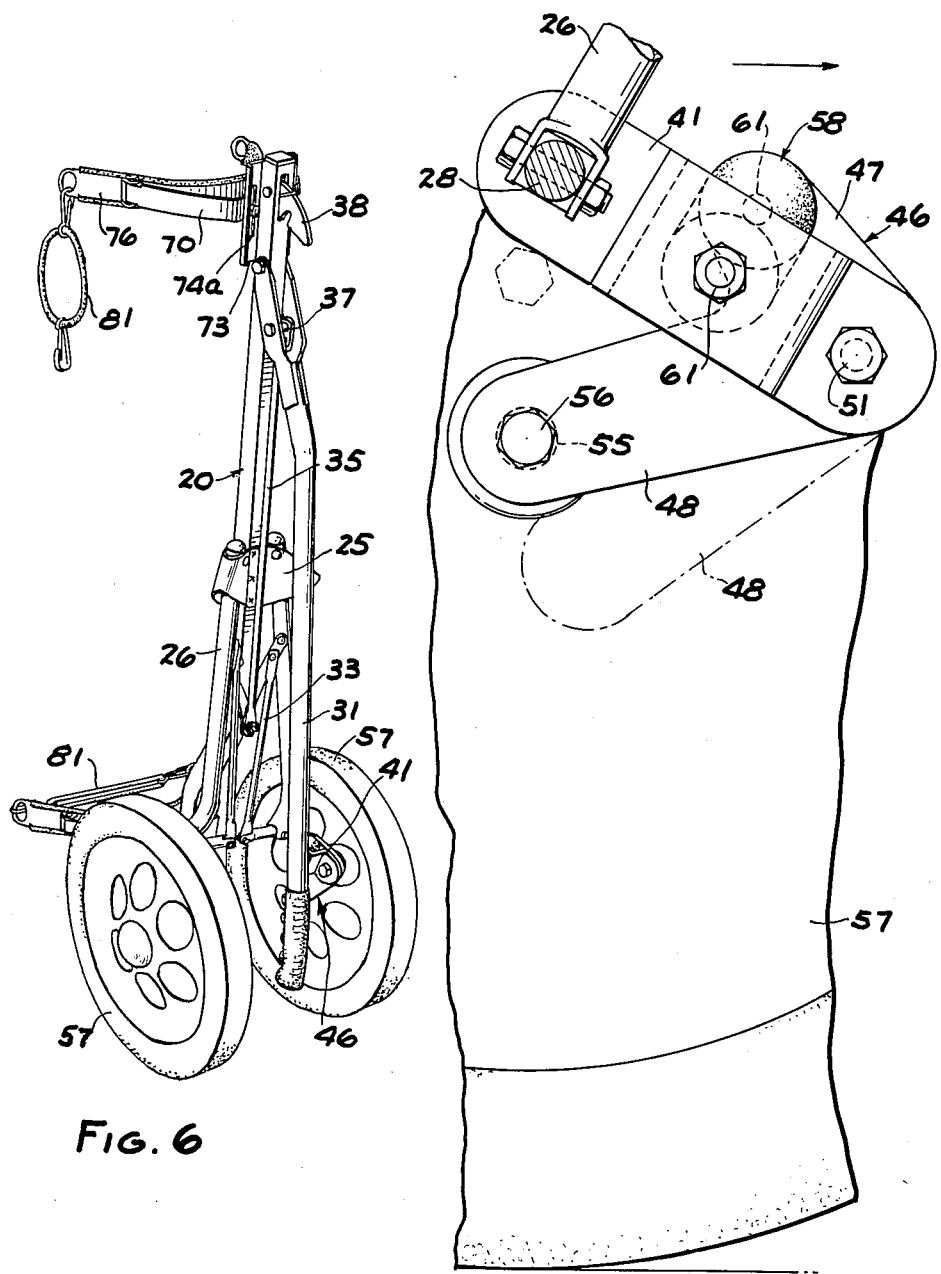
FIG. 6 is a perspective view of a golf cart in collapsed condition.
FIG. 7 is a fragmentary view of the wheel suspension arrangement showing in broken lines the relative positions of the parts during various load conditions.

Referring to FIG. 1, the golf cart comprises a tubular upright member 20 having a substantially straight upper portion 21 and a forwardly offset lower portion 22. A sheet metal bracket 23 is fixed to upright 20 intermediate its ends (FIGS. 1, 3 and 5) and comprises spaced walls 24, 25 extending laterally and rearwardly between which struts 26 are pivoted at 27. Pivots 27 are disposed on bracket 23 so that struts 26 may pivot inwardly and forwardly to a collapsed position (FIGS. 5 and 6) or outwardly and rearwardly to an operating position (FIGS. 1 and 3). A stub shaft 28 is pivoted by pin 29 (FIG. 8) to the lower end of each strut 26 and a wheel is suspended on the stub shaft 28 by a mechanism 30 as presently described. The member 20 and struts 26 comprise the support frame of the golf cart.

A collapsing mechanism is provided for swinging the wheels and struts 26 inwardly and forwardly into adjacent relationship to the upright member 20. This mechanism includes a handle 31 the inner end of which is bifurcated and pivoted to the upright at 32. A link 33 individual to each strut is pivoted at its lower end to the stub shaft 28 as at 28a and at its upper end to a toggle lever 34 as at 34a. The outer ends of the toggle levers 34 are pivoted to the strut 26 as at 34b and the inner ends are pivoted to each other as at 35a. An operating rod 35 is pivoted at its lower end to the pivotal connection 35a and is pivoted at its upper end to handle 31 by a yoke 36 through which a bolt 37 extends (FIG. 2). A latch 38 is pivoted on the upper end of upright 20 and is provided with a notch 39 which is adapted to engage bolt 37. A torsion spring 40 yieldingly urges the latch 38 downwardly. In the operative position of the golf cart, the handle is extended outwardly and rearwardly from the upright member 20 and the latch 38 engages with the bolt 37. This locks the struts 26 in their outward and rearward position as shown in FIG. 1. When the latch 38 is released by pivoting it upwardly, handle 31 may be swung downwardly to shift the operating rod 35 axially downwardly relative to the upright 20 and thereby swing the struts 26 forwardly and inwardly to the collapsed position through the toggle levers 34 and links 33. During this movement, the wheels are maintained in parallel relationship.

The general arrangement described above is old in the art and the invention relates in part particularly to the novel suspension means 30.

Referring to FIGS. 3, 5, 7 and 8, the suspension means for each wheel comprises a bracket or plate 41 which is fixed at one end to the stub shaft 28 by an arrangement which includes an opening 42 in plate 41 into which reduction portion 43 of stub shaft 28 extends and a screw 44 threaded into the end of the stub shaft 28. Plate 41 has a U-shaped intermediate portion 45. A bell crank lever 46 having a short leg 47 and a long leg 48 is pivoted to plate 41 at the junction between legs 47, 48 by an arrangement which includes threaded retainer 54 and a screw 51. Retainer 54 is fashioned with a shoulder 49 received by an opening 50 in lever 46 and a noncircular end 52 engaged within a similarly shaped opening 53 in the free end of plate 41. Retainer 54 and screw 51 hold the parts in assembled relation. Shoulder 49 has an axial extent slightly greater than the thickness of plate 46 so that the plate 46 can pivot on the shoulder. A stub axle 55 is fixed on the free end of the long leg 48 by a bolt 56 and a wheel 57 is journalled on the stub axle. A rubber spring element 58 is positioned between the plate 41 and lever 46 to yieldingly resist the pivotal movement of lever 46 relative to plate 41. As shown in FIGS. 9 and 10, rubber spring element 58 comprises a generally cylindrical rubber cushion member 59 into the ends of which discs 60 are imbedded. Threaded studs 61 integral with discs 60 extend axially outwardly from the discs. The ends of the spring element 58 are fixed one to plate 41 and the other to the free end of the short leg 47 of lever 46 by means of the studs 61 which extend through openings 62, 63, respectively, and nuts 64, 65 which are threaded on the studs. As shown in FIG. 8, the opening 63 in lever 46 is spaced radially from the pivotal connection at 51 at a slightly greater distance than the openings 62 in the U-shaped portion 45 of plate 41. Accordingly, in the normal unloaded condition of the cart, the rubber spring element 58 is distorted slightly in the fashion shown in FIG. 8.

Referring to FIGS. 11, 12 and 13, the means for supporting and clamping the bag on the upright member 20 is provided at the upper and lower ends of the upright member 20. Each means is identical and includes a first generally U-shaped spring steel strap 70 which includes a substantially straight bight portion 71 and outwardly bowed legs 72. A plate 73 is welded to the upright member 20 and the strap 70 is adjustably fixed on the plate by bolts 74 which extend through the bight portion 71 and vertically extending slots 74a on plate 73 (FIG. 1). A second U-shaped strap 76 of thinner spring steel is mounted on the outer ends of the arms 72 of first strap 70 by a structure which includes a pair of brackets 77 mounted on strap 76 at points spaced from the ends thereof. Brackets 77 have spaced flanges 78 between which a pin 79 extends. The end of each leg 72 of strap 70 is formed with a loop 80 through which the pin 79 extends to thereby pivot the strap 76 to the ends of the legs 72. Resilient means connecting the ends of the strap 76 are provided for encircling the golf bag and comprise a rubber ring 81 with hook clasps 82 which are adapted to engage openings 83 formed in the ends of the strap 76. A protective sheath such as a rubber cover 85 is provided on the inner surface of the strap 76 to prevent damage to the golf bag. Strap 76 is more flexible than strap 70. In FIG. 11, the position which strap 76 normally tends to assume and the outwardly bowed position of legs 72 are shown in broken lines.

As shown in FIG. 12, a ground engaging support 86 is provided for supporting the golf cart on the ground when not in use. Support 86 is made of a wire rod which has its ends fixed to the plate 73a at the lower end of the upright member 20. Support 86 has substantially horizontally extending portions 87 and a downwardly and rearwardly inclined loop 88 which engages the ground.

In practice, the golf bag G is placed on the golf cart with the lower end of the bag resting on the portions 87 of the support 86. Because of the spring nature of strap 70, the legs 72 automatically flex inwardly or outwardly to accommodate the general size of the golf bag when the ends of the strap 76 are wrapped around the bag. Clasps 82 are then secured to the ends of straps 76. Strap 76, because of its spring nature, conforms with the external configuration of the bag, snugly gripping the bag so that it is firmly supported on the golf cart. By this arrangement various sizes and shapes of golf bags may be readily supported on the golf cart in a firm manner. The bag brackets are universal and adapt themselves to the bag without any adjustment. The offset portion 22 permits pockets and other projections on the golf bag to be positioned adjacent the upright 20, as shown in FIG. 1.

When the golf cart is in the operative position with the ground engaging loop 88 resting on the ground, handle 31 is inclined upwardly and rearwardly and the bracket or plate 41 is generally horizontally disposed (FIG. 1). However, when the golf cart is pulled over the ground by the golfer, handle 31 is disposed more or less horizontally and plate 41 assumes the inclined position illustrated in FIG. 7.

In the unloaded condition of the golf cart, the leg 47 of lever 46 and plate 41 are in laterally juxtaposed relation as illustrated by the broken line showing of lever 46 in FIG. 7. When a golf bag containing golf clubs is mounted on the golf cart as described, the weight thereof causes lever 46 to pivot slightly about the shoulder 49 of retainer 54 in a clockwise direction as viewed in FIG. 7. The short lever leg 47 swings upwardly to the position shown in solid lines in FIG. 7 wherein the stud which connects one end of the rubber block 58 with the short leg 47 of lever 46 is shifted generally to the right and above the stud 61 which connects the other end of block 58 with plate 41. The supporting frame of the cart and the bags are resiliently supported in this manner by the rubber cushion members 58. When the cart is being pulled along the ground in this fashion and one or both of the wheels encounter a bump or other obstruction, the provision of the resilient suspension means disclosed materially reduces the effort required to pull the cart over the obstruction than would be the case if the wheels of the cart were rigidly mounted with respect to the frame. When either or both of the wheels encounter a bump, the wheels have a tendency to rock levers 46 clockwise about the pivotal connection at 51 as viewed in FIG. 7.

Thus, even though the wheels ride over the bumps encountered, the supporting frame of the cart and the golf bag supported thereby do not have to be immediately elevated the full vertical extent of the bump or obstruction. For this reason, the horizontal pull or force required to pull the cart over the bump is materially reduced. The rubber cushion members 58 are stressed primarily in shear to absorb the shock on the frame and handle of the golf cart when the wheels strike bumps or other obstructions on the ground. With this suspension arrangement, substantially all of the pull exerted by the golfer on the handle of the cart is used for propelling the cart horizontally and very little additional force or energy is required to pull the cart over bumpy ground.

The degree of resilience on the cart is, of course, dependent upon the hardness of the rubber from which the spring elements 58 are formed. If the rubber is relatively hard, the suspension arrangement becomes relatively rigid; and if the rubber is too soft, then there is too much "bounce" in the cart. I have found that with the various parts sized generally in accordance with the proportions shown in FIGS. 7 and 8, spring elements 58 formed of a relatively soft rubber having a Shore durometer hardness of about 40 produce a very satisfactory operation.

Thus, it will be seen that I have provided a golf cart having a wheel suspension designed such that a minimum amount of shock is transmitted to the hand of the golfer when pulling the cart behind him and which is furthermore designed so as to require a minimum of effort on the part of the golfer to pull the cart along over bumpy ground. In addition, I have provided means for firmly securing a golf bag on the cart which are readily adjustable to accommodate different sizes and shapes of golf bags and which in any event snugly embrace the golf bag throughout substantially its entire circumferential extent.

I claim:

1. In a golf cart, the combination comprising a frame for supporting a golf bag, a handle extending generally rearwardly from said frame when the cart is in position for movement along the ground, means on said frame for supporting said golf cart for movement along the ground comprising a plate fixed adjacent the lower end of said frame and extending generally rearwardly, a lever pivoted to and adjacent the rear end of said plate and extending generally forwardly, said plate having an intermediate U-shaped portion, a rubber cushioning element fixed at one end to said intermediate U-shaped portion and at the other end to said lever, said lever having a portion extending forwardly below said rubber cushioning element, an axle fixed on said portion of said lever, and a wheel rotatably mounted on said axle.

2. The combination set forth in claim 1 wherein said ends of said element are fixed to said plate and lever respectively at radially different distances from said point of pivotal connection of said plate to said lever.

3. In a golf cart, the combination comprising a generally upright member having means thereon for supporting a golf bag, a handle extending generally rearwardly from said upright member when the cart is in position for movement along the ground, a pair of struts pivotally connected to said upright member intermediate its ends and extending generally outwardly, downwardly and rearwardly when the cart is in position for movement along the ground, a plate fastened to each said strut and extending generally rearwardly, a lever pivoted to said plate adjacent its rear end and extending generally forwardly, said plate having an intermediate U-shaped portion, a rubber cushioning element positioned in said U-shaped portion and having one end thereof fastened to said plate and the other end thereof fastened to said lever, an axle fixed to said second plate at a point vertically below said cushioning element, and a wheel rotatably mounted on said axle.

4. In a golf cart, the combination comprising generally upright support means for supporting a golf bag, a handle extending generally rearwardly from said support means when the cart is in position for movement along the ground, and means adjacent the lower end of said support means for supporting said cart for movement along the ground comprising a first member fixed on said support means and extending generally rearwardly, a second member pivoted to said first member about a generally horizontal axis and extending generally forwardly, a wheel rotatably mounted on said second member and resilient means operatively connecting said first and second members and yieldably restraining pivotal movement of said second member, said resilient means comprising a rubber cushioning element having one end thereof fixed to said first member and the other end thereof fixed to said second member, the connections of said element with said members being spaced radially different distances from the pivotal connection between the first and second members and said element is stressed by said connections.

5. In a golf cart the combination comprising a generally upright member for supporting a golf cart, a handle extending generally rearwardly from said support means when the cart is in position for movement along the ground, struts fastened to said upright member intermediate its ends and extending generally rearwardly when the cart is in position for movement along the ground, a first member on the lower end of each strut and extending generally rearwardly, a second member pivoted to said first member and extending generally forwardly, a wheel rotatably mounted on said second member, and resilient means extending between each said first member and each said second member respectively and yieldingly opposing relative pivotal movement between said first member and said second member, said resilient means comprising a rubber cushioning element having one end thereof fixed to said first member and the other end thereof fixed to said second member, said rubber cushioning element being generally cylindrical in the unstressed condition, the ends thereof being fixed to the respective members at radially different distances from the pivotal connection of said first member to said second member whereby said element is distorted.

6. In a golf cart, the combination comprising a generally upright member for supporting a golf cart, a handle extending generally rearwardly from said upright member when the cart is in position for movement along the ground, struts fastened to said upright member intermediate its ends and extending generally rearwardly when the cart is in position for movement along the ground, a stub shaft pivoted on the lower end of each strut and extending generally laterally, a plate fixed on said stub shaft and extending generally rearwardly, a lever pivoted to and adjacent the rear end of said plate and extending generally forwardly, a wheel rotatably mounted on said lever, and a rubber cushioning element having one end thereof fixed to said plate and the other end thereof fixed to said lever and yieldingly opposing relative pivotal movement back and forth between the plate and the lever, said rubber cushioning element being generally cylindrical in the unstressed condition, the ends thereof being fixed to the respective members at radially different distances from the pivotal connection of said first member to said second member whereby said element is distorted.

7. In a golf cart, the combination comprising generally upright support means for supporting a golf bag, a handle extending generally rearwardly from said support means when the cart is in position for movement along the ground, and means on said support means for supporting said cart for movement along the ground comprising a first member rigidly fixed adjacent the lower end of said support means and extending generally rearwardly, a second member pivoted to said first member and extending generally forwardly, a rubber cushioning element having one end thereof fixed to said first member and the other end thereof fixed to said second member and yieldably restraining pivotal movement of said second member back and forth from a neutral position relative to said first member, and a wheel rotatably mounted on said second member at a point spaced vertically below said first member and forwardly of said cushioning element, the ends of said blocks of rubber being spaced radially different distances from the point of pivotal connection of said first member to said second member and said blocks are thereby prestressed.

References Cited in the file of this patent

UNITED STATES PATENTS

| | | |
|---|---|---|
| 2,043,011 | Schjolin | June 2, 1936 |
| 2,147,518 | Boxan | Feb. 14, 1939 |
| 2,215,182 | Latshaw | Sept. 17, 1940 |
| 2,477,187 | Lanchner | July 26, 1949 |
| 2,599,354 | Stableford | June 3, 1952 |
| 2,687,895 | Rutledge | Aug. 31, 1954 |
| 2,740,622 | Hickman | Apr. 3, 1956 |
| 2,741,490 | Chamberlin | Apr. 10, 1956 |
| 2,957,707 | Zagwyn | Oct. 25, 1960 |

FOREIGN PATENTS

| | | |
|---|---|---|
| 509,177 | Great Britain | July 12, 1939 |